Dec. 28, 1937.  A. S. BAILEY  2,103,401

ANIMAL POKING IMPLEMENT

Filed April 15, 1937

INVENTOR.
Archie S. Bailey
BY
ATTORNEYS.

Patented Dec. 28, 1937

2,103,401

UNITED STATES PATENT OFFICE 2,103,401

ANIMAL POKING IMPLEMENT

Archie S. Bailey, Albert Lea, Minn., assignor of one-half to John P. Donahue, Twin Lakes, Minn.

Application April 15, 1937, Serial No. 137,033

3 Claims. (Cl. 119—1)

The present invention relates to improvements in implements for guiding or directing animals, such as hogs, particularly in connection with stockyard operation.

The present method of guiding hogs is by striking them, or by poking them with implements that bring about abrasions and injury to the meat.

An object of the present invention is to provide an implement that is sufficiently resilient in the guiding surface that is brought in contact with the animal, to prevent any injury, and that is furthermore particularly convenient of assembly and of strength and rigidity in the supporting portion of the guiding member to permit of the most effective use.

These and other features of the invention will be more particularly brought out in the following description and the accompanying drawing, wherein.

Figure 1:
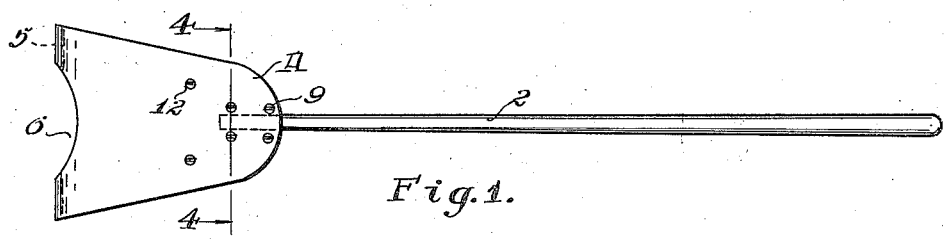
Figure 1 is a plan view of the implement.
Figure 2:
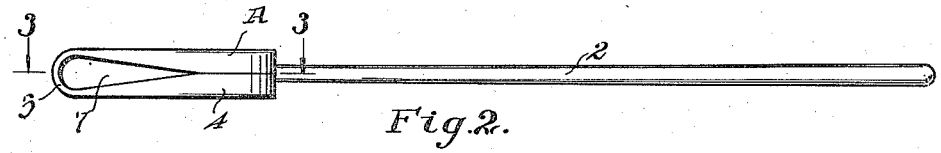
Figure 2 is a view in side elevation thereof.
Figure 3:
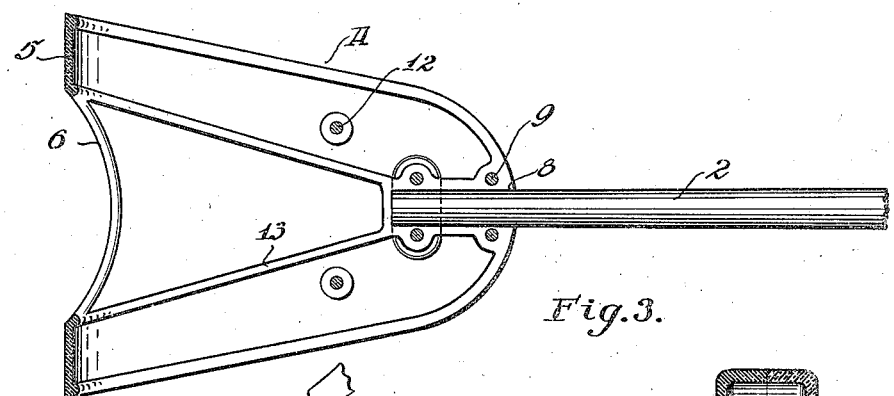
Figure 3 is a sectional view on line 3—3 of Figure 2.

Referring to the drawing in detail, A represents the guiding member of the implement, and 2 the supporting handle. In the construction as shown in the drawing, the guiding member A is made in the form of a rubber sheet doubled upon itself, as shown in Figure 2, with the doubled front portion 3 relatively thin, and the rear portion 4 relatively thickened to form the anchoring section for the handle.

As shown, the member A is materially wider at its front doubled end, tapering back to the rear handle anchoring portion, to bring about the requisite resiliency of the front doubled portion that comes in contact with the animal. The extreme doubled edge, as indicated by the dotted lines 5, is of relatively soft rubber. This doubled edge also is preferably cut away at the center portion 6 to assist in guiding the animal.

The resiliency of the front doubled edge of the guiding member A is further increased by the spacing indicated by 7 between the top and bottom walls of the relatively thin doubled guiding portion of the implement. The relative hardness of the guiding member A, back of the resilient guiding edge of the implement, forms a strong support for the handle 2.

Figure 4:
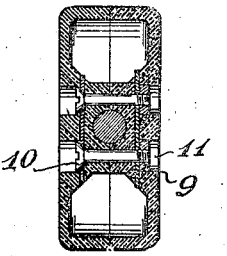
Figure 4 is a sectional view on line 4—4 of Figure 1.
Figure 5:
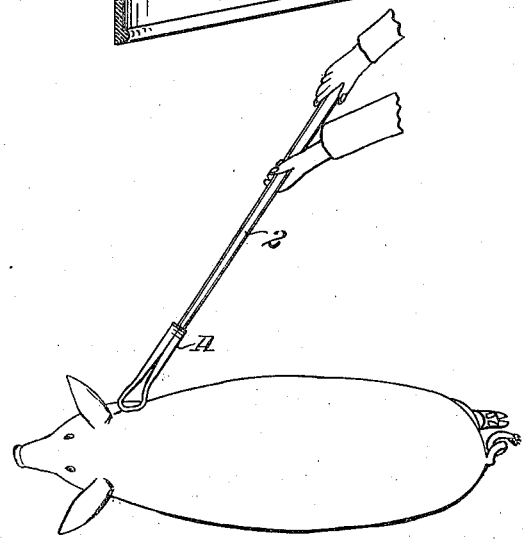
Figure 5 illustrates the implement being used in a guiding operation.

The handle is preferably anchored in position, as shown, by being inserted in the central, longitudinally extending grooves 8 in the inner faces of the rubber guiding portion A. The opposite rubber walls enclosing the handle are secured together to anchor the handle in position by studs 9, extending through the material upon opposite sides of the handle, as shown in Figure 4, each stud preferably having at one end a head 10 imbedded in the rubber, with a nut 11 similarly imbedded in the other wall and threaded over the adjacent end of the stud.

To further strengthen the rubber, studs 12 are similarly anchored through the side walls forwardly of the anchoring of the handle. Further strengthening and stiffening of the side rubber walls may be secured by the ribs 13.

The essential idea of the invention is to produce a rubber contacting surface that will be quite resilient so as not to in any way injure the animal, but at the same time to secure back of that resilient contacting portion a rigidity in connection with the handle supporting portion.

In the construction as shown and described, this is brought about by the folded character of the rubber sheet, the relative resiliency of the contacting portion, and the stiffening of the handle portion through the arrangement of anchoring connections, as the studs 9.

The rubber itself may be, as set forth, relatively soft in the contacting portion, or the stiffening of the handle portion may be fully secured as by the arrangement of anchoring and stiffening means adjacent the handle. The essential novelty of the invention is to secure a relatively flat guiding member that has maximum resiliency along its guiding edge and is yet stiffened adjacent the handle portion.

I am aware that it is old to use brooms, wire fingers, etc., for the purpose for which this invention is designed, but in these implements there is the relative movement of the prongs that bring about scratching and the tendency of the device to slip from the animal in use and the breaking and bending of the separated fingers, etc., that make the devices objectionable, and which objection is overcome by this invention.

I claim:

1. An animal poke comprising a guiding end formed of a doubled rubber sheet, a handle centrally secured between the free ends of said sheet, and anchoring and stiffening means for said double sheet in the handle supporting portion, bringing about relative resiliency in the outer doubled edge of said sheet.

2. An animal poke having a comparatively flat guiding portion of rubber doubled upon itself, a handle anchored between the free ends of said doubled material, and means bringing about a relative resiliency to the doubled edge of the material opposite the handle.

3. An animal poke comprising a guiding member formed of rubber doubled upon itself, the walls of the doubled portion of the material constituting the contacting edge being relatively resilient, and means for anchoring a handle in the opposite end of the guiding portion between the adjacent walls of the material, consisting of anchoring members connecting the material alongside the handle and between the handle and contacting edge of the member, for the purpose set forth.

ARCHIE S. BAILEY.